United States Patent [19]
Michaels

[11] Patent Number: 5,169,506
[45] Date of Patent: Dec. 8, 1992

[54] OXYGEN CONCENTRATION SYSTEM UTILIZING PRESSURIZED AIR

[75] Inventor: Gregory A. Michaels, Seven Hills, Ohio

[73] Assignee: Invacare Corporation, Elyria, Ohio

[21] Appl. No.: 689,145

[22] Filed: Apr. 22, 1991

Related U.S. Application Data

[63] Continuation-in-part of Ser. No. 636,487, Dec. 31, 1990.

[51] Int. Cl.[5] .............................. C25B 9/00
[52] U.S. Cl. .................... 204/242; 204/270; 204/274; 204/277; 204/278; 55/2
[58] Field of Search .......... 204/274, 278, 421; 429/30; 55/2

[56] References Cited

U.S. PATENT DOCUMENTS

| | | | |
|---|---|---|---|
| Re. 28,792 | 4/1976 | Ruka et al. | 204/17 |
| 1,120,436 | 12/1914 | Bergfeld | 423/579 |
| 3,400,054 | 9/1968 | Ruka et al. | 204/1 |
| 3,410,783 | 11/1968 | Tomter | 204/266 |
| 3,888,749 | 6/1975 | Chong | 204/129 |
| 4,061,554 | 12/1977 | Chillier-Duchatel et al. | 204/129 |
| 4,089,938 | 5/1978 | Turner | 423/579 |
| 4,132,766 | 1/1979 | Erickson | 423/579 |
| 4,287,170 | 9/1981 | Erickson | 423/579 |
| 4,300,987 | 11/1981 | Tseung et al. | 204/129 |
| 4,340,578 | 7/1982 | Erickson | 423/579 |
| 4,341,847 | 7/1982 | Sammells | 429/27 |
| 4,377,460 | 3/1983 | Hirayama et al. | 204/195 |
| 4,391,690 | 7/1983 | Lin et al. | 204/412 |
| 4,395,468 | 7/1983 | Isenberg | 429/31 |
| 4,408,951 | 10/1983 | Ishii | 415/36 |
| 4,431,715 | 2/1984 | Isenberg | 429/30 |
| 4,475,994 | 10/1984 | Gagné et al. | 204/129 |
| 4,490,444 | 12/1984 | Isenberg | 429/31 |
| 4,515,874 | 5/1985 | Steinleitner | 429/104 |
| 4,526,775 | 7/1985 | Cassano | 423/579 |
| 4,529,577 | 7/1985 | Chen et al. | 423/351 |
| 4,565,685 | 1/1986 | Cassano | 423/579 |
| 4,664,987 | 5/1987 | Isenberg | 429/31 |
| 4,738,760 | 4/1988 | Marianowski et al. | 204/130 |
| 4,808,491 | 2/1989 | Reichner | 429/13 |
| 4,812,329 | 3/1989 | Isenberg | 427/115 |
| 4,876,163 | 10/1989 | Reichner | 429/30 |
| 4,888,254 | 12/1989 | Reichner | 429/31 |
| 4,908,113 | 3/1990 | Marianowski et al. | 204/243 R |

*Primary Examiner*—John Niebling
*Assistant Examiner*—Kathryn Gorgus
*Attorney, Agent, or Firm*—Fay, Sharpe, Beall, Fagan, Minnich & McKee

[57] ABSTRACT

An oxygen concentration system for producing oxygen from pressurized air comprises an electrochemical oxygen generator which selectively extracts oxygen from air by an electrochemical reaction. The oxygen concentration system includes first, second, and third concentric enclosures. The three enclosures produce three annuli formed between the enclosures. Air enters the top of the outermost enclosure, travels downwardly through the outermost annulus, crosses over the second annulus to the oxygen generators via ports, travels upwardly through the oxygen generators and back downwardly through the second annulus. By orienting the downward flow of the oxygen-depleted air next to the downward flow of the cooler incoming air, the incoming air is heated by the outgoing hot air, thereby increasing comfort to the user and reducing energy requirements.

20 Claims, 6 Drawing Sheets

OXYGEN CONCENTRATION SYSTEM UTILIZING PRESSURIZED AIR

BACKGROUND OF THE INVENTION

The present application is a continuation-in-part of application Ser. No. 07/636,487, filed on Dec. 31, 1990.

This invention pertains to the art of methods and devices capable of separating oxygen from air, and more particularly, to the separation of oxygen from air to supplement an otherwise deficient oxygen supply, such as in aircraft flying at high altitudes.

DESCRIPTION OF RELATED ART

It is common for aircraft traveling at high altitudes to supplement oxygen to pilots and passengers via the use of stored oxygen. Typically, the oxygen is stored in heavy, bulky steel cylinders. The cylinders are replenished between flights from a ground-based oxygen source. The present invention could be utilized to eliminate the need for such cylinders and thereby reduce the weight of an aircraft's oxygen supplying equipment. Because weight is a critical consideration in aviation, advantages in runway length required, fuel required, and other significant advantages are obtainable by decreasing the weight necessary for supplying oxygen to passengers and crew.

Extra cylinders are normally carried in the event that some aspect of the flight goes amiss. For example, if a runway is shut down, or if the landing gear on the airplane does not function properly, it may be necessary for the aircraft to fly for a few hours longer than originally estimated. Due to these occurrences, extra cylinders of oxygen are carried on aircraft to allow for these contingencies. If a method was available whereby cylinders could be replenished over the course of the flight, contingency cylinders would not be necessary.

Some devices have been developed to separate, concentrate, or generate oxygen from ambient air. Many of these devices are based on nitrogen adsorption systems which concentrate oxygen from air to deliver a maximum of 95% $O_2$ by removing nitrogen from ambient air. U.S. Pat. No. 4,449,990 describes one such apparatus. Such devices require a parasitical purging of one tank by pure oxygen from another tank in order to maintain effectiveness. Further, moisture in a system can be damaging to the nitrogen adsorption material.

To overcome the foregoing deficiencies in the art, applicant saw the need for a lightweight device which could generate pure oxygen from pressurized air to supplement or replace oxygen stored in cylinders on aircraft.

The present invention contemplates a new and improved oxygen generation system which overcomes many of the foregoing difficulties and deficiencies in the prior art while providing better and more advantageous overall results.

SUMMARY OF THE INVENTION

In accordance with the present invention, a new and improved oxygen concentration system is provided which utilizes an electrochemical process. More particularly, in accordance with the invention, the oxygen concentration system includes an electrochemical oxygen generator which has an outer surface and selectively extracts oxygen from air by an electrochemical reaction. The generator is contained within a first enclosure which has a top end and a bottom end. The first enclosure is contained within a second enclosure which also has a top end and a bottom end. The second enclosure is contained within a third enclosure which also has a top end and a bottom end. A first annulus is formed between the outer surface of the generator and an inner surface of the first enclosure. A second annulus is formed between an outward surface of the first enclosure and an inward surface of the second enclosure. A third annulus is formed between an outward surface of the second enclosure and an inward surface of the third enclosure. Near the top end of the third enclosure, there is an inlet. Pressurized air enters the inlet and travels downwardly in the third annulus, upward in the first annulus, and downward in the second annulus, exiting the oxygen concentration system through the second annulus.

According to a further aspect of the invention, the second enclosure is made of a non-insulating material.

According to another aspect of the invention, the air entering the third annulus is cooler than the air in the second annulus, the second enclosure transferring heat from the air in the second annulus to air in the third annulus.

According to another aspect of the invention, the third annulus contains the coolest air in the system.

According to another aspect of the invention, the system comprises ports which extend between the third annulus to the first annulus. The ports isolate air traveling in the ports from air within the second annulus. The ports extend through the first and second enclosures at a point adjacent the bottom and of the third enclosure. In one embodiment, the inner and outer surface of the ports have fins which increase heat transfer from air outside the port to the port and heat transfer from the port to the air inside the port.

According to another aspect of the invention, the top end of the second enclosure is covered with an inner outer dome. The inner outer dome has inward and outward surfaces, the inward surface being reflective.

According to another aspect of the invention, the top end of the third enclosure comprises an outer upper dome, an apex of the outer upper dome comprising an orifice.

According to another aspect of the invention, an oxygen concentration system for producing oxygen from pressurized air comprises an electrochemical oxygen generator which has an outer surface and selectively extracts oxygen from air by an electrochemical reaction. Inner and outer enclosures are concentric with the generator, the generator being received within the inner enclosure which is in turn received with the outer enclosure. An inner annulus is formed between the generator and the inner enclosure and an outer annulus is formed between the inner enclosure and the outer enclosure. Air in the outer annulus is cooler than air in the inner annulus. The system operates on pressurized air and is independent of orientation.

According to another aspect of the invention, an oxygen concentration system suitable for replenishing oxygen cylinders on aircraft comprises a plurality of electrochemical oxygen generators, the generators are arranged in a hexagonal array and selectively produce oxygen from air by an electrochemical reaction. The generators have an outer surface. A first enclosure has top and bottom ends and inward and outward surfaces. The plurality of generators are received within the first enclosure. The first enclosure is thermally insulated to keep heat from the generators within the first enclosure. The top end of the first enclosure is open. The bottom end of the first enclosure comprises a bottom dome. An apex of the bottom dome comprises an orifice. The orifice is connected to conveying means extending between the orifice and the plurality of generators. The conveying means, in the preferred embodiment a series of rods, conveys oxygen produced by the generators to the orifice; the orifice being connected to a mechanical compressor to fill associated oxygen storage cylinders. A second enclosure has a top and bottom end and inward and outward surfaces. The first enclosure is concentrically received within the second enclosure. The top end of the second enclosure comprises an inner upper dome. The inner upper dome is made of non-insulating material and has a reflective surface. The bottom end of the second enclosure comprises an inner bottom dome. The inner bottom dome is made of an insulating material and has a reflective surface. A third enclosure has a top and bottom end and inward and outward surfaces. The second enclosure is concentrically received within the third enclosure. The top end of the third enclosure comprises an outer upper dome; an apex of the outer upper dome terminating in an orifice. The bottom end of the first enclosure comprises an outer bottom dome. The outer bottom dome is made of an insulating material. A first annulus is formed by the outer surface of the plurality of generators and the inward surface of the first enclosure. A second annulus is formed by the outward surface of the first enclosure and the inward surface of the second enclosure. A third annulus is formed by the outward surface of the second enclosure and the inward surface of the third enclosure. Ports connect the third annulus to the first annulus. The ports extend through holes in the first and second enclosures. The ports are aerodynamically shaped so as to reduce losses within the second annulus. The ports have fins extending into the second annulus to transfer heat from air in the second annulus to the port. The port also has fins extending inwardly into the port to transfer heat from the port to air in the port.

According to a still further aspect of the invention, a method of replenishing oxygen storage cylinders comprises the steps of energizing an electrochemical generator, the generator capable of generating oxygen from air on application of an electric current;

introducing pressurized air to said generator;

directing oxygen produced by the generator to associated oxygen storage cylinders in replenishing the cylinders therewith;

directing oxygen-depleted air from the generator in a heat-exchanging relationship to cooler incoming pressurized air.

One advantage of the present invention is the provision of a device which can operate independent of orientation. Namely, in that the device operates on the basis of pressurized air, rather than convection or some other orientation-sensitive phenomena. The system can operate effectively regardless of orientation. This is important when the device is used in aircraft such as jet fighters which may assume any orientation during the course of a mission.

Another advantage of the invention is the reduced weight over an amount of oxygen storage cylinders necessary to supply an equivalent amount of oxygen. As stated earlier, aviation is highly dependent on the weight necessary to accomplish a certain task. By reducing the number and/or size of oxygen cylinders required for a mission, advantages in fuel, speed, runway length, and aircraft design are obtainable.

Another advantage of the present invention is the efficient conservation and utilization of heat generated by the electrochemical oxygen generators. Because these generators operate at high temperatures, and because the oxygen must cool down before suitable for consumption by humans, the invention utilizes heat transfer techniques and specific configurations to keep as much heat as possible in the generator itself and use cooler incoming air to cool down the exiting gases. Energy savings result from using warm exiting air to preheat incoming cooler air.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts, a preferred embodiment of which will be described in detail in the specification and illustrated in the drawings which form a part hereof and wherein.

DESCRIPTION OF THE PREFERRED EMBODIMENT

Figure 3:
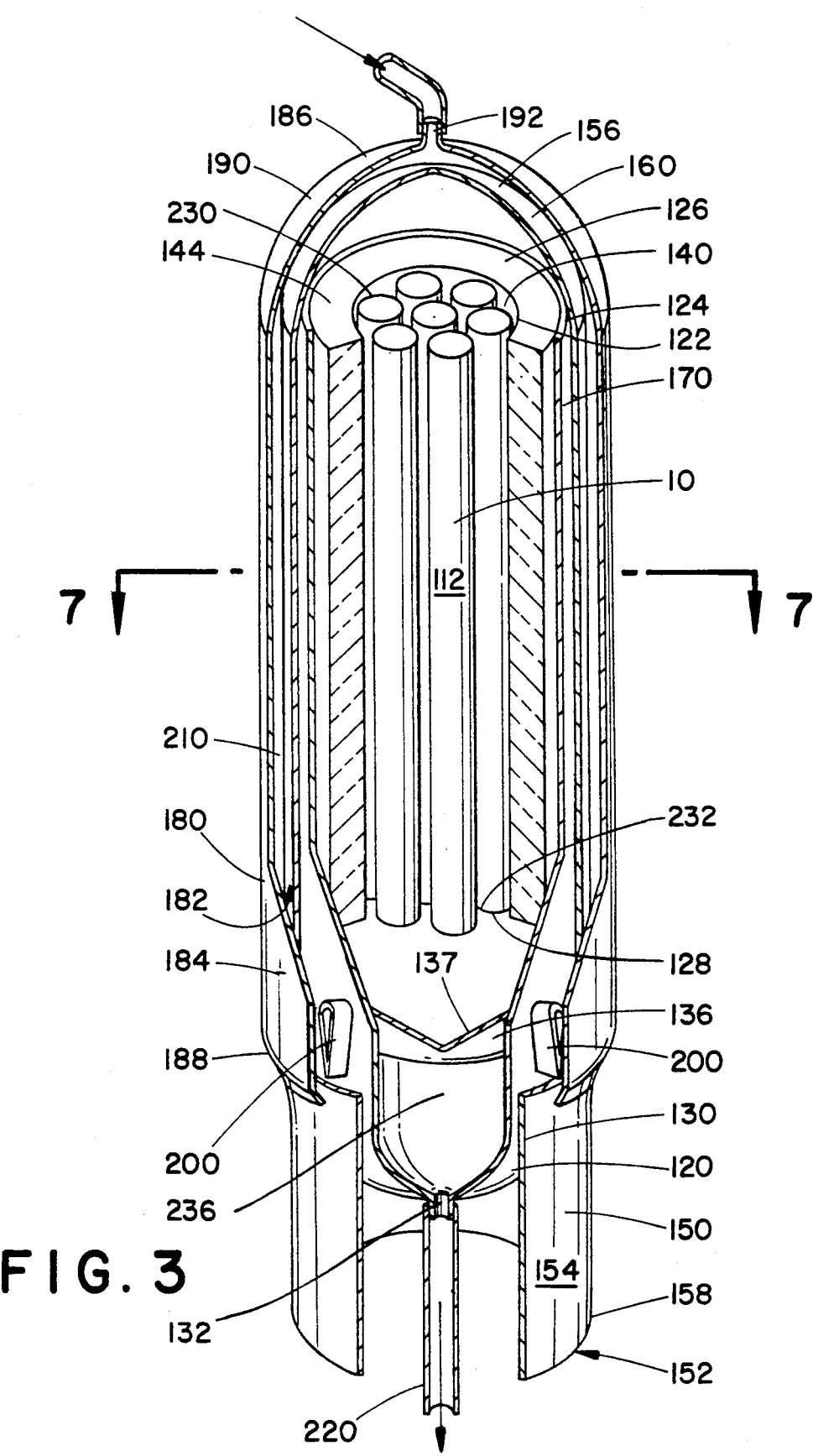
FIG. 3 is front elevational view in partial cross-section showing one embodiment of the present invention with the rods removed for clarity.

Referring now to the drawings, wherein the showings are for purposes of illustrating a preferred embodiment of the invention only, and should not be used to limit the scope of the invention, FIG. 3 shows a front, elevational, cross-sectional view of the invention.

The invention essentially comprises a specially designed housing enclosing an oxygen generator 10. The oxygen generator 10 generates oxygen from air via an electrochemical process. The specially designed housing orients air around the generator 10 in specially advantages ways.

In some applications, due to oxygen flow rate demands or geometric constraints, a single tubular generator 10 is a preferred configuration. In other applications, a plurality of generators 10 will be the preferred configuration. When a plurality of generators 10 is used, a preferred configuration of the generators 10 is in the form of a hexagonal array.

The number of generators 10 in each array are determined by the oxygen production requirements of the system and by the following mathematical formula:

$$X = 1 + \sum_{n=1} 6(n-1)$$

where
X=total number of generators in array
N=number of generators along a radius of the array
A series of numbers which are solutions to the above equation are:

1, 7, 19, 37, 61, 91, 127, 169, 217, 271, ...

For example, in array featuring nineteen tubular generators 10, the array would feature a single generator 10 in the center, surrounded by six generators 10, which in turn are surrounded by twelve generators 10. In the embodiments shown in FIGS. 3-5, N=2 and the array comprises seven generators 10.

The hexagonal configuration of the array is advantageous for minimizing the volume necessary to accommodate a certain number of generators 10. The hexagonal shape permits a large number of generators 10 to be put into a small volume.

For example, the following chart shows how the hexagonal arrangement of the generators 10 allows for greatly increased oxygen production without a proportionate increase in volume required. The chart describes several embodiments of the invention.

| | | |
|---|---|---|
| Generator Diameter = | 2 | inches |
| Generator Voltage = | 37 | volts |
| Generator Current = | 36 | amps |
| Generator Length = | 39 | inches |
| System Height = | 60 | inches |
| No. Cells = | 53 | |
| Cell Length = | 0.7 | inches |
| Cell Area = | 2.8 | sq. in. |

| No. of Generators | Oxygen Delivery (1 pm @ RTP) | System Diameter (inches) | System Volume (cu. ft.) | System Weight (lbs) | Power Required (kW) | Power Required (hp) |
|---|---|---|---|---|---|---|
| 1 | 7 | 8 | 2 | 41 | 1 | 2 |
| 7 | 50 | 11 | 3 | 56 | 9 | 12 |
| 19 | 137 | 16 | 7 | 139 | 25 | 34 |
| 37 | 268 | 21 | 12 | 263 | 49 | 66 |
| 61 | 442 | 26 | 18 | 419 | 81 | 109 |
| 91 | 659 | 31 | 26 | 628 | 121 | 163 |
| 127 | 921 | 36 | 35 | 870 | 170 | 227 |

The hexagonal configuration also aids in retaining heat within first enclosure 120. Finally, the configuration provides for uniform heating of the generators 10 within the first enclosure 120 via radiation.

The determination of the number of generators 10 necessary for a specific oxygen generation system requires an initial evaluation of the volume available for the generators 10.

When a range of acceptable generator 10 lengths is determined, the area of generators 10 can be determined by knowing the surface areas of individual cells within the generator 10. In the one embodiment, each cell had an area of 18 cm$^2$, a driving current density of 1.5 A/cm$^2$, and a cell current of 27 A. The oxygen production would be (27 A/cell)(3.80 ml/A-min)=102.6 ml O$_2$/min-cell. Multiplying this number by the number of cells per generator 10 yields the oxygen production of each generator 10. By increasing the current density, the number of cells 12 can be decreased. By adjusting the number of cells per generator 10, the number of generators 10 can be adjusted to fit within the hexagonal array as described above.

A second, currently preferred, embodiment of an oxygen concentration system has been developed which utilized seven electrochemical generators 10. The embodiment was developed for an aircraft application requiring an oxygen deliver rate of 13.1 liters/min.

The physical dimensions of the system appear in Table A. The weight of the system components appear in Table B. The electrical parameters, power requirements, and oxygen delivery are detailed in Table C.

TABLE A

| | |
|---|---|
| Generator Diameter | 2.05 in. |
| Generator Spacing | 0.5 in. |
| Effective Diameter | 2.55 in. |
| Generator Length | 39.37 in. |
| No. of Cells | 53 |
| System Length | 60 in. |
| Generators/System | 7 |
| Diameter of Hexagonal Array | 8 in. |
| Insulation Thickness | 2 in. |
| Annuli Gap | 1 in. |
| Overall Diameter | 16 in. |
| Total Cross-Sectional Area | 200 sq. in. |
| Volume | 7 cu. ft. |

TABLE B

| | |
|---|---|
| Generator Weight | |
| cells | 5.33 lbs. |
| two end caps | 0.38 lbs. |
| Alumina Tube | 0.15 lbs. |
| Inconel Rod | 0.80 lbs. |
| Weight/generator | 6.66 lbs. |
| Total Weight-Seven Generators | 47 lbs. |
| Insulation | 14 lbs. |
| Enclosures | 21 lbs. |
| Electronics | 18 lbs. |
| Total System Weight | 100 lbs. |

TABLE C

| Oxygen (1 pm) | Voltage (volts) | Current (amps) | Current Density (mA/cm$^2$) | Power Required (watts) | | | |
|---|---|---|---|---|---|---|---|
| | | | | O$_2$ | T$_e$* | Heat (Cool) | Total |
| 13.1 | 9.57 | 9.29 | 516 | 622 | 418 | 1960 | 3000 |

TABLE C-continued

| Oxygen (1 pm) | Voltage (volts) | Current (amps) | Current Density (mA/cm²) | Power Required (watts) | | |
|---|---|---|---|---|---|---|
| | | | | O₂ | T_e* | Heat (Cool) | Total |
| 38.31 | 28 | 27.16 | 1509 | 5323 | 0 | (2323) | 5323 |
| 28.75 | 21 | 20.38 | 1132 | 2996 | 999 | (995) | 3995 |
| 19.16 | 14 | 13.59 | 755 | 1332 | 190 | 1478 | 3000 |
| 9.58 | 7 | 6.79 | 377 | 333 | 48 | 2620 | 3000 |
| 5.48 | 4 | 3.88 | 216 | 109 | 0 | 2891 | 3000 |

*$T_e$ = electronics

The operation of the generators 10 and the electrochemical reaction by which the generators 10 concentrate oxygen from air will be discussed later in this specification.

Figure 4:
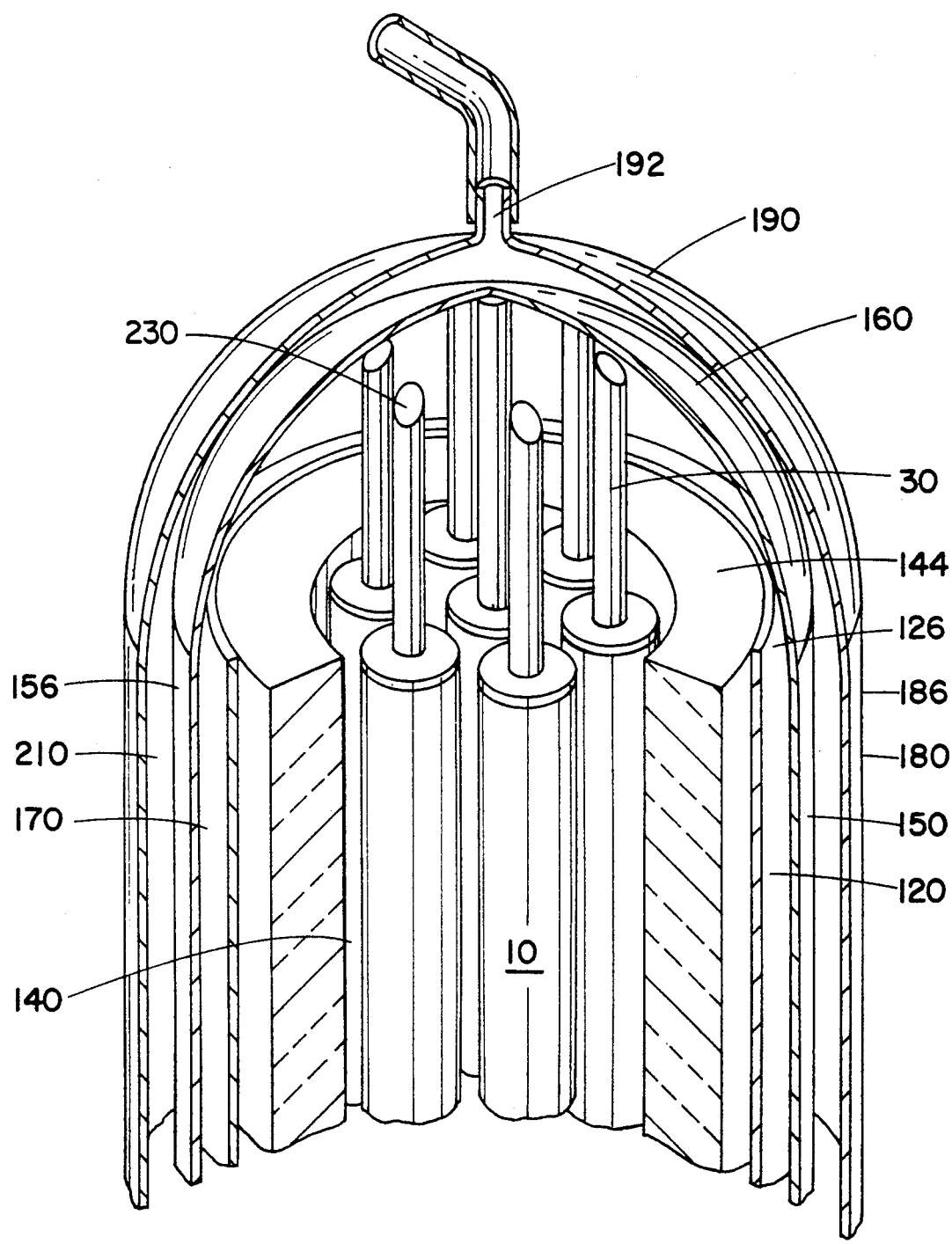
FIG. 4 is an enlarged front elevational view in partial cross-section showing the upper half of the embodiment shown in FIG. 3.

With reference to FIGS. 3 and 4, a first enclosure 120 surrounds the generators 10. The first enclosure 120 is annular in shape, having an inward surface 122, and outward surface 124, and a top and bottom end 126, 128. The portion of the first enclosure 120 between the inward surface 122 and the outward surface 124 comprises the interior of the first enclosure 120. The interior 144 of the first enclosure 120 is insulated with alumino silicate. In the preferred embodiment, the insulation 144 is 2 inches thick and has a reflective backing which holds the fibers together, as well as contributing to the efficiency of the device by reflecting infrared radiation back into the generators 10. The preferred insulation material is manufactured by the Carborundum Company under the trade name Fiberfrax ® HSA Systems.

Figure 5:
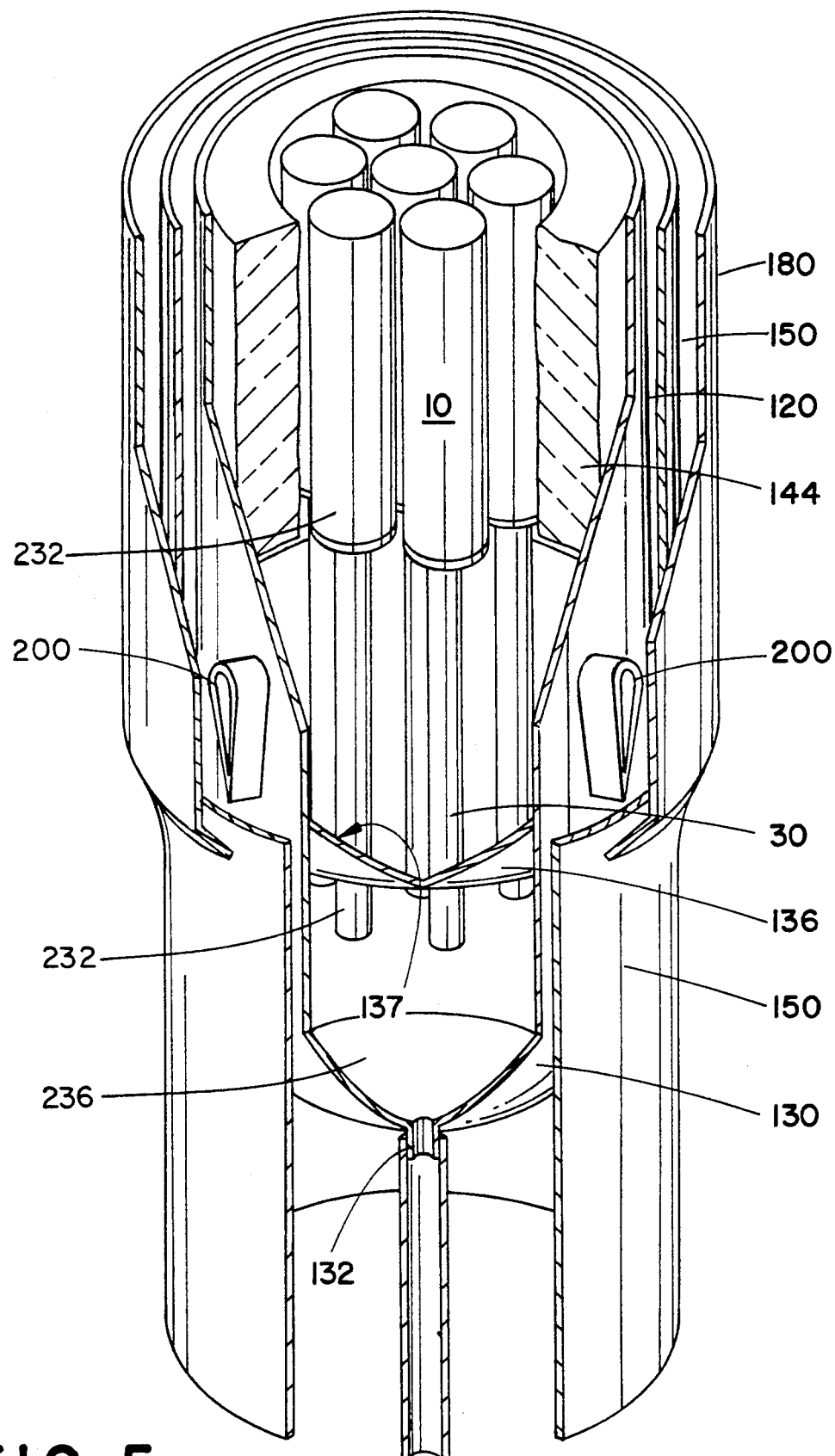
FIG. 5 is an enlarged front elevational view in partial cross-section showing the lower half of the embodiment shown in FIG. 3.
Figure 6:
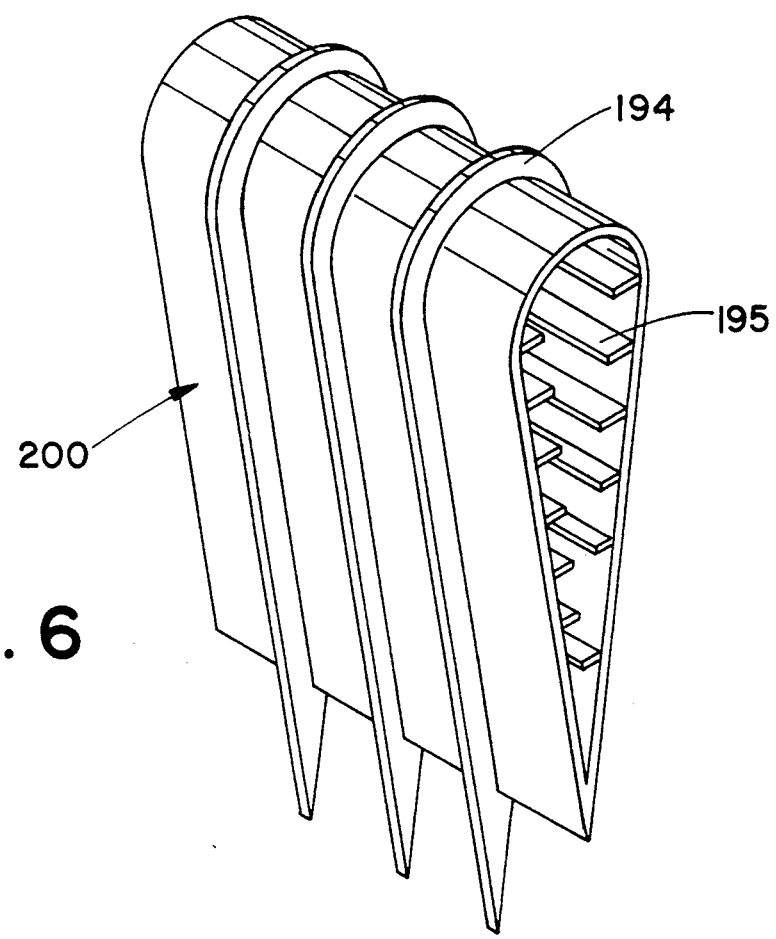
FIG. 6 is an end view of one of the ports according to the invention.

The first enclosure 120 is concentrically arranged about the center of the generators 10. The top end 126 of the first enclosure 120 is open. With reference to FIG. 5, the bottom end 128 comprises an outer bottom dome 130 which terminates at an apex in an orifice 132. The outer bottom dome 130 is made of a thermally insulating material. Within the outer bottom dome 130 there is an inner bottom dome 136. The inner bottom dome 136 is also made of a thermally insulating material. An inward surface 137 of the inner bottom dome 136 is made of a reflective material, so as to reflect infrared radiation back into the generators 10. The inner bottom dome 136 has a larger radius of curvature than the outer bottom dome 130. Outer edges of the inner bottom dome 136 are attached to the inward surface 122 of the first enclosure in an airtight seal, preventing transmission of gas from one side of the inner bottom dome 136 to the other.

Figure 1:
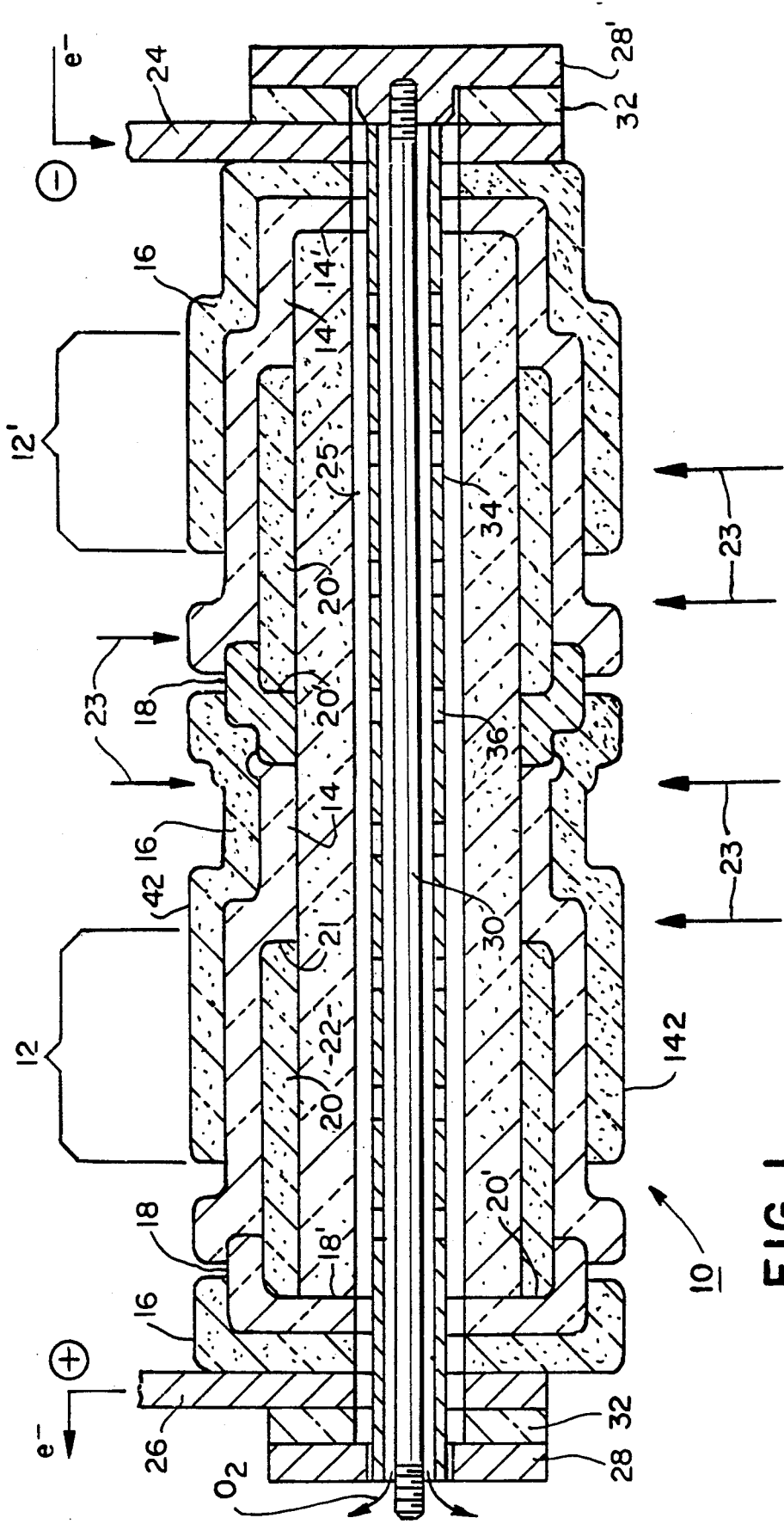
FIG. 1 is a plan view, partially in section, of one embodiment of a tubular, stepped, stacked, oxygen generator used in this invention, showing the cell configuration, in sealed portions, power contacting connections, and source of air.

With reference to FIGS. 1, 2, 4, and 5, the generators 10 are supported within the oxygen generation system via rods 30. The rods 30 function to support the generators 10 within the system. The rods 30 also can be used to heat the generators 10 in a manner that will be discussed below. With reference to FIG. 1, the rods 30, along with sleeves 34, also function as conveying means to convey oxygen produced by the oxygen generators 10 downwardly through the first enclosure 120 to the orifice 134 and eventually to associated storage cylinders. An annulus is formed between the sleeve 34 and rod 30. Oxygen produced by the generator 10 exits the device through this annulus. For ease of illustration and discussion, the rods alone will be illustrated in most of the FIGURES.

With reference to FIGS. 3–5 and 7, a first annulus 140 is formed between outer surfaces of the generators 10 and the inward surface 122 of the first enclosure 120. The first annulus 140 serves as a passageway for air within the system.

Figure 7:
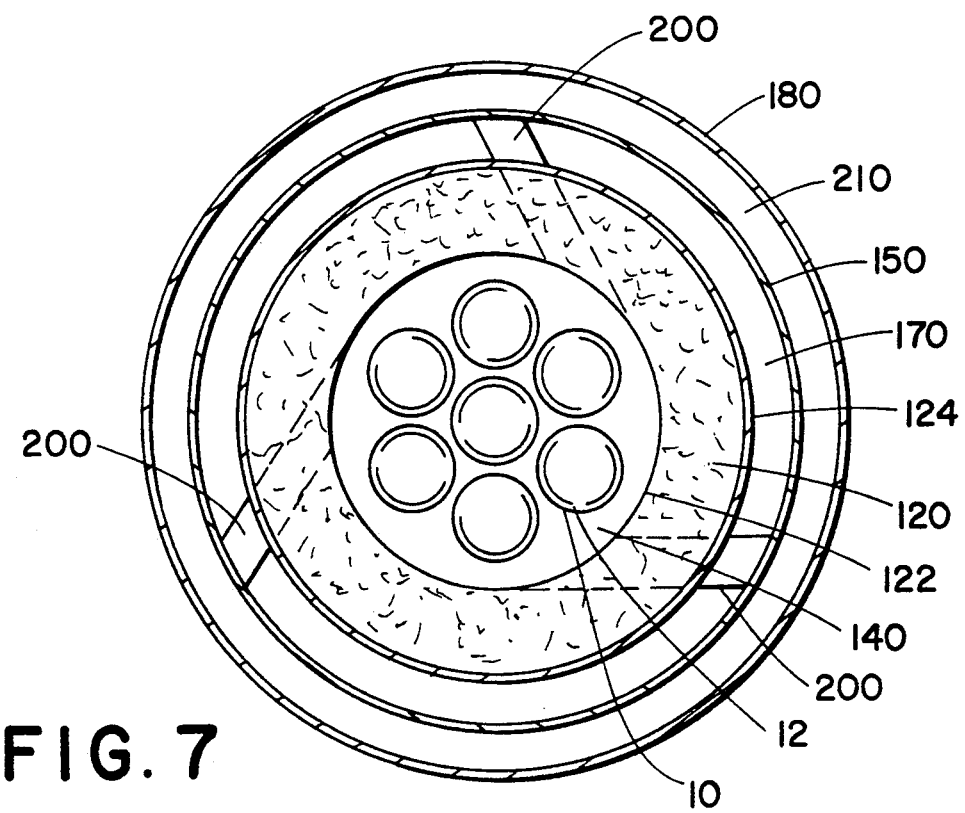
FIG. 7 is a top cross-sectional view of the invention taken along line 7—7 of FIG. 3.

With reference to FIGS. 3, 4, and 7, a second enclosure 150 comprises inward and outward surfaces 152, 154 and top and bottom ends 156, 158. The second enclosure 150 is made of a thermally-non-insulating material so that heat may be transferred through it easily. In the preferred embodiment, this material is aluminum. The top end 156 of the second enclosure 150 comprises an inner upper dome 160. The inner upper dome 160 is made of thermally-non-insulating, but reflecting material. In the preferred embodiment, this material is aluminum. The reflective material is on the inward side of the inner upper dome 160 and is effective to reflect infrared radiation which emanates from the generators 10 back within the first annulus 140. The inner upper dome 160 is closed. The bottom end 158 of the second enclosure is open.

A second annulus 170 is formed between the outward surface 124 of the first enclosure and the inward surface 152 of the second enclosure.

A third enclosure 180 comprises inward and outward surfaces 182, 184 and top and bottom ends 186, 188. The top end 186 of the third enclosure 180 comprises an outer upper dome 190. The third enclosure 180 concentrically receives the second enclosure 150 which concentrically receives the first enclosure 120. An apex of the outer upper dome 190 terminates in an orifice 192.

The bottom end 188 of the third enclosure 180 is attached to the outer surface 154 of the second enclosure 150.

With reference to FIGS. 3 and 5–7, near the junction of the bottom end 188 of the third enclosure and the outward surface 154 of the second enclosure 150 are a plurality of ports 200. The ports 200 are tubular-like passageways through the first and second enclosures 120, 150. The ports 200 prevent air in the ports 200 from mixing with air in the second annulus 170. The ports 200 are aerodynamically-shaped to reduce losses arising from air which is travelling downwardly in the second annulus 170 impacting the ports 200. In the preferred embodiment, the ports 200 are angled so that air exiting the third annulus 210 is tangentially received into the area beneath the generators 10. In FIG. 5, in the preferred embodiment, fins 194, 195 are placed on the outward surface and inward surface of the ports. Fins 194 on the outward surface of the ports 200 are effective to transfer heat from air in the second annulus to the ports themselves. Fins 194 on the inward surface of the ports 200 are effective to transfer heat from the ports 200 themselves to the air travelling in the ports 200. In the preferred embodiment, there are three ports 200 about the circumference of the oxygen generation system.

With reference to FIGS. 3, 4, and 7, a third annulus 210 is formed between the outward surface 154 of the second enclosure and the inward surface 182 of the third enclosure 180.

An upper end 230 of each of the rods 30 and each of the sleeves 34 is fixedly attached to the inward surface of the inner upper dome 160 but do not penetrate the inner upper dome 160. In other words, the upper ends 230 of the rods 30 and sleeves 34 comprise a closed passageway for oxygen travelling along the rod 30. To exit the system, oxygen must travel downwardly to a lower end 232 of each rod 30.

With reference to FIG. 5, the lower ends 232 of each of the rods 30 and each of the sleeves 34 are fixedly attached to the inner bottom dome 136. The lower ends 232 penetrate the inner bottom dome 136, allowing oxygen to travel from the generators 10 to the rods 30 to a reservoir 236 between the inner bottom dome 136 and the outer bottom dome 130. The oxygen that collects in the reservoir 236 is pushed out orifice 132 due to pressure generated by the electrochemical reaction itself, as is explained later in this specification.

The operation of the enclosures and annuli in regards to oxygen generation will now be explained with reference to FIGS. 1-7. Because the system operates at a pressure slightly above ambient, the system is operative independent of its orientation. The system is not "pressurized" in the sense that the housings 120, 150, 180 and domes 160, 190 are designed to withstand large pressure differences. Typically, the compressors of the aircraft's jet engine are used to provide compressed air at pressures between ambient and 400 pounds per square inch (psi). Typically, incoming air pressure will be slightly above ambient and total losses over the system are about 1 psi. The pressurized air is introduced into orifice 190. The pressurized air so introduced impacts the outer surface of the inner upper dome 160 and travels downwardly in the third annulus 210 until reaching the ports 200. For the purposes of this explanation, directions such as "upward" and "downward" will be utilized with reference to FIG. 3, with the top of the page being "up" and the bottom of the page being "down". It is important to understand that one of the benefits of this invention is that it can operate effectively regardless of orientation. In other words, whether or not orifice 192 is at the "top" of the generation system, air will travel through the device in the manner described below. The pressure of the incoming air can be used to modulate the flow rate of air, which in turn can be used to modulate the temperature of the device. Since the exhaust air carries away some heat generated by the generators 10, a change in the air flow rate affects the temperature of the device.

Air passes downwardly in the third annulus 210, to and through the ports 200 and into the area beneath the generators 10. As the air passes upwardly through the generators 10, oxygen is produced in an electrochemical reaction which will be described below. Oxygen so produced travels through an annulus formed between a hollow sleeve 34 and solid rods 30 to discharge tube 220 where a mechanical compressor (not shown) stores the oxygen in associated storage cylinders (not shown). As the air passes through the generators 10, it is heated significantly and exits the top end 126 of the first enclosure 120. The air at this location of the device is the hottest air in the oxygen generation system.

The heated air now impacts the inward surface of the inner upper dome 160. The inward surface is thermally-non-insulating but is reflective. These qualities enable the inner upper dome 160 to transfer heat from the hot air exiting the generators 10 to the cooler air entering the system through orifice 192. At the same time, the reflective nature of the inner upper dome 160 reflects infrared heat back to the generators 10 and the first annulus 140.

After impacting the inward surface of the inner upper dome 160, the air is directed by the shape of the inner upper dome 160 into the second annulus 170. The air passes downwardly through the second annulus 170 and eventually out of the system. During the time the hot air is travelling downwardly in the second annulus 170, it is cooled in two ways. First, the air flows over ports 20 and fins 194. Heat from the air is transferred to the ports 200 and eventually to air flowing in the ports 200 via fins 195. Second, air in the second annulus 170 is juxtaposed beside the coolest air in the system, that incoming air in the third annulus 210. This arrangement provides a couple of advantages. First, energy is conserved in that air in the third annulus 210 is heated by the air in the second annulus 170. Further, the coolest air in the system is positioned at the outer surface, i.e. the third annulus 210. This causes the outward surface 184 of the third enclosure to be cool, which provides safety and comfort benefits. Even though the device operates at very high temperature, on the order of 900° C., the outer surface is cool to the touch and the danger of burns to humans or other heat-sensitive entities around the oxygen generation system is minimized.

An important material-related feature is the use of silver lead wires for electrical connections. Because the device operates at about 900° C., care must be taken to chose materials which will retain operational and dimensional stability at those temperatures. Silver melts at 961° C., and therefore can remain dimensionally stable at these operating temperatures. Another advantage is that silver will not oxidize. While gold and platinum will also work, silver is preferred for applications which operate at temperatures below its melting point because it is less expensive and is not subject to oxidation, as is platinum. Platinum, with a melting point of 1,769° C., is the preferred material at operating temperatures above the melting points of gold and silver. The top end 230 of rod 30 is preferably used as the electrical contact for incoming electrical power. The top end 230 is relatively cool.

With reference to FIG. 1, the operation of the electrochemical oxygen generator 10 will now be explained. In this explanation, the term "tubular" is meant to include any axially elongated structural form having a closed cross-section. The term "air electrode" means that electrode which contacts ambient air on the outside of the generator and allows formation of oxygen ions from oxygen in the air. The term "oxygen electrode" means that electrode which allows formation of oxygen gas from oxygen ions and allows passage of the oxygen gas into the interior of the generator. The term "dense" means at least 95% of the theoretical density.

The generator 10 is driven by a DC power source. Aircraft typically utilize a 28 volt DC power supply. The generator 10 operates at from 65° C. to 1,100° C. with preheated air and is able to extract pure oxygen at the electrolyte surface at a rate proportional to the electric current.

Referring now to FIG. 1 of the drawings, a high temperature electrochemical device 10 useful as an oxygen generator is shown, having a closed cross-section, preferred tubular form, and comprising a plurality of adjacent electrochemical cells, the active lengths of which are shown as first cell 12 and adjacent cell 12', arranged end to end. In some embodiments, a single tubular oxygen generator is used. In other applications, such as some which require higher flow rates, a series of tubular oxygen generators can be placed within a single inner housing. In such cases, the currently preferred arrangement is a hexagonal array. A currently preferred embodiment features seven generators 10 in such a hexagonal array. The cells 12 are electrically connected in series through continuous, spaced-apart solid oxide electrolyte bands or segments 14, continuous, spaced-apart air electrode band 16, continuous, spaced-apart interconnection segments 18, and continuous, spaced-apart oxygen electrode bands 20.

Optional, porous support 22, which is preferably from 20% to 40% porous (80% to 60% of theoretical density), and which is generally used, as shown, supports oxygen electrodes 20 and the rest of the structure. Dense, solid electrolyte 14 is disposed on top of part of the inner oxygen electrode 20 starting a predetermined length from a first end 20' of each oxygen electrode. Outer porous air electrode 16 is disposed on top of part of the electrolyte 14 and in contact with air 23 which surrounds the generator body 10.

Electrical connection from cell to cell is made by a stacked configuration, where dense, preferably 100% dense, gas impervious, electronically conductive inner-connection 18 is deposited over and contacts part of the uncovered portion of support 22 next to the oxygen electrode 20 from cell 12' and overlaps a portion of that oxygen electrode. Dense, gas impervious, ionically conducting, solid electrolyte 14 from first cell 12 is deposited on top of the inner, oxygen electrode 20 from cell 12 continuing beyond the end 21 of the oxygen electrode and onto the remaining uncovered portion of support 22, overlapping inter-connection 18 next to cell 12' but not contacting the adjacent oxygen electrode band 20 of cell 12'. The combination of electrolyte and inner-connection closes off the porosity in the underlying support and oxygen electrode. Both electrolyte and inner-connection material are disposed between inner electrodes of adjacent cells, and this is essential in this design to prevent gas leakage.

In the embodiment shown in FIG. 1, the dense electrolyte 14 overlaps the dense inter-connection 18 between cells 12 and 12' and overlaps the dense inter-connection 18 near the positive terminal 26, which latter connection forms a dense end portion for that device. This overlapping produces a gas impermeable barrier between the outside and the inside of the device.

Air electrode 16 from cell 12 is deposited on top of the electrolyte 14 from cell 12 continuing until contacting the inter-connection 18 between cells 12 and 12'. To prevent electrical shorting between cells, a gap region is maintained between the air electrode 16 of cell 12, and the electrolyte 14 of cell 12'. These coatings of materials can be laid down by any suitable application masking techniques, such as electrochemical vapor deposition, sputtering, powder sintering, plasma arc spraying, and the like. Electrochemical vapor deposition is a preferred method of depositing electrolyte and inter-connection materials, and reference may be made to U.S. Pat. No. 4,609,562 (Isenberg, et al.) herein incorporated by reference for details on that process.

This generator device is capable of generating oxygen gas from air upon application of an electrical current. Electrons from a DC power source (not shown) are fed into a terminal 24 (negative terminal), preferably of round washer design having an extended bus bar contact area. The electrons pass through the air electrode 16 of cell 12', where oxygen in the air 23 which need not be pressurized, is reduced at the operating temperature of the generator, preferably 650° C. to 1,100° C., to provide oxygen ions $O^=$, which pass through the ionically conductive, electronically non-conducting (does not pass $e^-$) solid electrolyte 14. The oxygen ions recombine to form pure $O_2$ gas at the oxygen electrode 20 and pass through the porous support 22 into the central chamber 25. The reactions are:

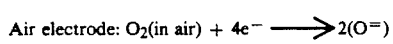

I.

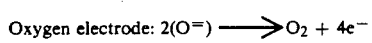

II.

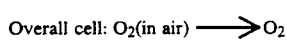

III.

As shown in FIG. 1, electrons release in the oxygen electrode 20 from cell 12', pass through inter-connection 18 between cell 12 and cell 12' into the air electrode 16 of cell 12, where identical electrode reactions occur, with electrons generated in the oxygen electrode 20 from cell 12 finally passing to terminal 26 (positive terminal) of similar design as terminal 24, through the adjacent interconnection 18 and air electrode 16, and back to the DC power supply.

Thus, the tubular segment of inter-connection material between cells provides electrical continuity (allows a flow of electrons) from the outer air electrode from a first cell 12' to the inner oxygen electrode of a second cell 12, on the same device or tube, in a series arrangement. Also, air 23 is prevented from directly passing into the central chamber 25 by a continuous, dense, preferably 100% dense, barrier of electrolyte bands or segments 14 and inter-connect segments 18. The dense electrolyte bands or segments, in part, overlap and seal to the dense inter-connection segments 18. This air impermeability of the generator body is essential to providing high purity $O_2$ in the central chamber. While length 12 and 12' define the "active" lengths of the two cells shown in FIG. 1 and in FIG. 2, electrode and electrolyte components shown extending out beyond the active length, are considered the active part from that particular cell. The incoming air 23 may preheated consistent with the overall system design previously described prior to contact with the air electrodes 16 of the generator.

A variety of end closures or portions, preferably dense, can be used in the apparatus shown. In FIG. 1, the dense inter-connection portion 18', near the positive terminal, and the dense electrolyte portion 14', near the negative terminal, are overlapped at the ends of the device and disposed transverse to the axial length of the device, as shown, to provide end closures. A high temperature resistant metal, central, axial rod 30, tube or the like, of, for example, Inconel (nickel-chromium alloy), having threads at each end, can be use in conjunction with metal end sheets 28 and 28', to secure the sheets and the dense inter-connection and electrolyte portions in a compressed relationship. As shown, one end of the rod 30 would be screwed into a mated thread, machined into the inner side of sheet 28', and the other end would be screwed down onto insulating rings 32 by an effective spring means (not shown), applying axial pressure to the end sheets, and assuring a gas tight fit against the flat metal terminals 24 and 26. In a preferred embodiment, the generator 10 is preheatable by placing a voltage differential at the opposite ends of the axial rod 30. In such embodiments, the rod 30 material is chosen to develop the desired heat at the desired current levels.

A suitable, high temperature resistant metal or ceramic tubular sleeve 34, having a plurality of vents or holes 36 therethrough, suitably sealed to end sheet 28, can provide oxygen delivery through the end closures 18', as shown by the O2 arrows. Inconel and alumina would both be suitable as the sleeve 34. In some instances, it may be desirable to have oxygen delivery though both ends. Alternatively, an additional hole can be drilled through end closure 18', and air electrode 16, terminal 26 ceramic ring 32 and end sheet 28, and a tube inserted for oxygen delivery, similar to 38 in FIG. 2. This tube 38 can be made to cooperate with discharge tube 220 of FIG. 3. The design of FIG. 1 utilizes a substantial amount of metal hardware in contact with ceramic components. There, positive and negative terminals contact air electrode material at each end of the device. The design of FIG. 2, while having more complicated terminal connections, can provide a primarily all-ceramic device, eliminating some possible problems of varying coefficients of thermal expansion between selected metals and ceramics.

Figure 2:
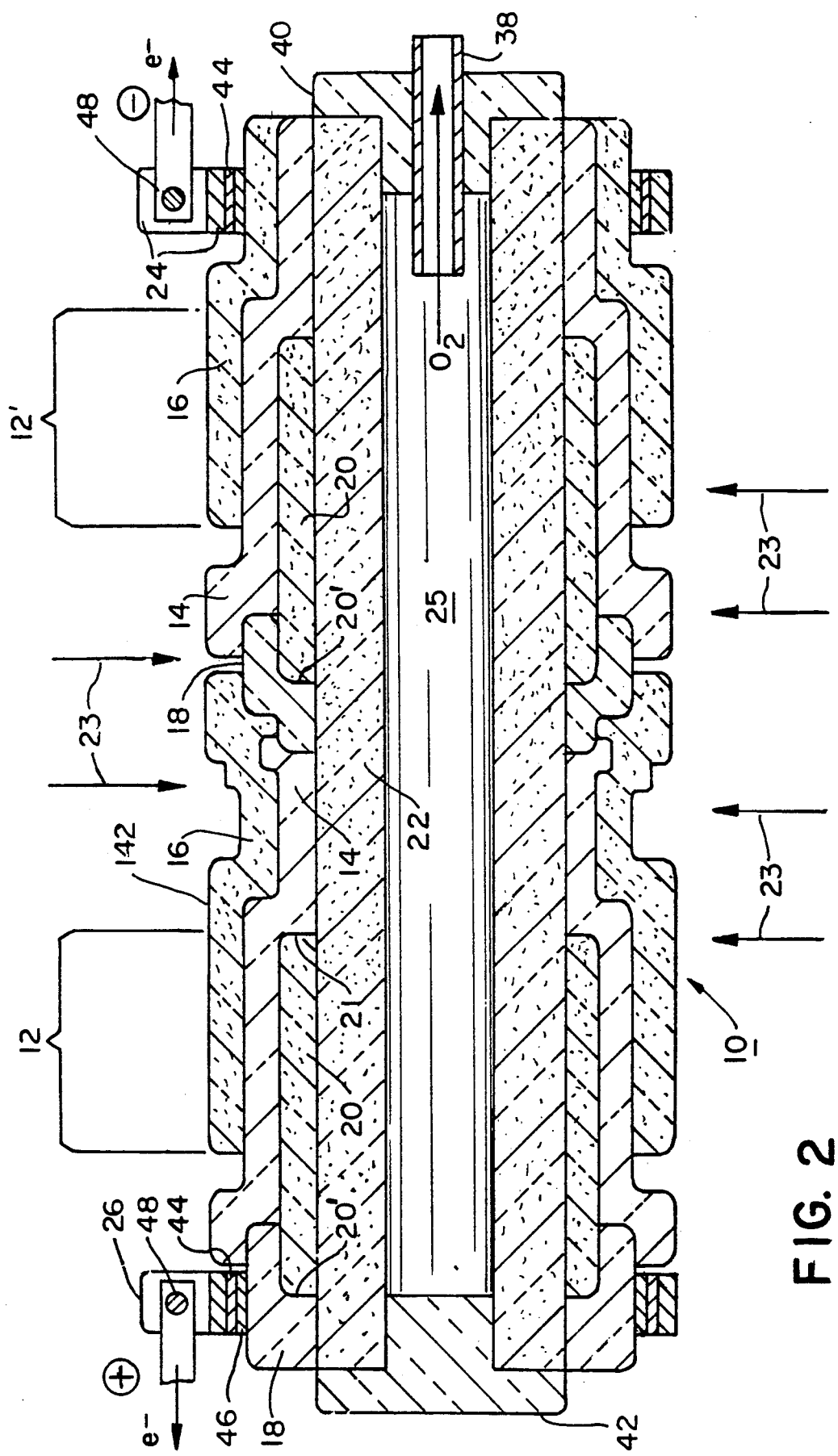
FIG. 2 shows another embodiment of the oxygen generator used in this invention, in plan view partially in section.

In FIG. 2, the cell structure and inter-connection between cells are essentially the same as the device of FIG. 1, utilizing the same materials and substantially the same cell connection design. However, ceramic end portions or caps 40 and 42 are used in place of the end overlapping inter-connection 18' and end overlapping electrolyte 14' design of FIG. 1. This use requires a sinter seal comprising very fine ceramic particles (not shown) between end portions or caps 40 and 42 and the ceramic support 22. The ceramic end portions are preferably dense, to the degree of being gas impervious, and are preferably of the same material as the support tube. Preferably, the ceramic support tube 22, in both embodiments, will be a zirconia material, such as stabilized zirconia, most preferably calcia-stabilized zirconia, for example $(ZrO_2)_{0.85}(CaO)_{0.15}$. This material, is pressed and highly densified form, is preferably also used as the ceramic end portions or caps 40 and 42 in FIG. 2.

Preferably, a seal (end portion or cap to support tube) is produced by squeezing in a preformulated paste of very fine particle size calcia stabilized zirconia into the gap region when the end portions or caps are inserted. The ceramic end seal assembly is then dried and sintered in place, to complete fabrication. The narrow gap of the joint, the long, tortuous path, and the near-ambient pressure during operation of the device will all contribute to minimize leakage of any air into the central chamber 25 so that high purity O2 can be provided. A minor amount of sintering aid, such as FeO for example, can be used in the adhesive paste and can also be used in both the support tube and end caps. Other suitable ceramic materials can also be used for the support tube, and the end caps which overlap the end of support tube 22.

While the device of FIG. 1 relies primarily on a pressure seal between overlapping end inter-connection material 18', overlapping end electrolyte material 14', contacting metal terminals 24 or 26, ceramic spacers 32, and metal sheets 28 and 28', any useful high temperature adhesive can also be used between those components to assure minimal air permeation into central chamber 25.

The terminal connections on the device of FIG. 1 are of simple round washer design, having an extending bus bar contact area secured by pressure tightening rod 30, where the terminals 24 and 26 are preferably silver (m.p. 961° C.), but can also be platinum (m.p. 1,769), or palladium and alloys of palladium and platinum with silver, if the device is to be operated close to its 1,100° C. maximum operating temperature.

In the device of FIG. 2, terminal attachments are of circular band design, and directly electrically contact the top surface of the inter-connection material at one end and the air electrode material at the other end of the device, and require cushioning layers. The negative terminal 24 electrically contacts the air electrode 16, preferably through a fiber metal ring 44, preferably of silver-palladium fibers. A metallic split ring clamp constitutes the terminals 24 and 26, which are shown partly in section. The terminals 24 and 26 are preferably silver-palladium alloy, but can also be solid nickel, preferably coated with silver-palladium alloy. Terminal 26 in the FIG. 2 design electrically contact inter-connection material 18 and may require an additional fiber metal ring 46, preferably of silver-palladium. Also shown in FIG. 2 are bus bar, bolt, nut, lock washer assemblies 48. Oxygen gas from the central chamber 25 shown in FIG. 2 can be delivered through tube 38, which is preferably of a ceramic such as calcia-stabilized zirconia, or by any other appropriate means at one or both ends.

Useful and approximate, non-limiting dimensions for both oxygen generator device designs are porous support tube: 44 mm inside diameter, 50 mm outside diameter by 1,000 mm long; porous oxygen electrode: 15 mm long by 1 mm thick; dense interconnection: 0.05 mm to 2 mm thick; dense electrolyte: 11 mm long by 0.05 mm thick; and porous air electrode: 15 mm long by 0.1 mm thick. The unit would be a single stack, having a multiplicity of series-connected cells each about 1.1 cm long having an area of approximately 18 cm². For sake of simplicity, the drawings are not shown to scale.

Useful porous support tube materials, preferably from 4 mm to 10 mm thick, have been previously discussed, The oxygen electrode 20, preferably from 0.5 mm to 2 mm thick, is a 20% to 40% porous, sintered oxide material selected from doped and undoped oxides or mixtures of oxides in the pervoskite family, such as $CaMnO_3$, $LaNiO_3$, $LaCoO_3$, and preferably $LaMnO_3$, or other electronically conducting mixed oxides generally composed of rare earth oxides mixed with oxides of cobalt, nickel, copper, iron, chromium and manganese, and combinations of such oxides. Dopants when used are preferably selected from calcium, strontium, and magnesium, with strontium dopant preferred. The most preferred oxygen electrode is lanthanum manganite doped with strontium, for example $La_{0.9}Sr_{0.1}MnO_3$. The air electrode is preferably applied by dip slurry application and sintering.

The dense inter-connection material, 18, can be selected from the group consisting of platinum-zirconia, palladium-zirconia, silver-palladium-zirconia, palladium, platinum, palladium-silver, doped lanthanum manganite, and doped lanthanum chromite. The preferred inter-connection material is selected from the group consisting of doped lanthanum manganite, palladium, platinum, and palladium-silver. Dopants for the lanthanum manganite or lanthanum chromite are selected from the group consisting of calcium, strontium, and magnesium, with strontium dopant preferred. The most preferred inter-connection is doped lanthanum manganite. The inter-connection material is gas impervious and near 100% dense. It can be applied by well known vapor deposition techniques, and is usually from 0.05 mm to 2 mm thick. Densification can be achieved by a variety of techniques besides vapor deposition, including vapor sputtering, plasma spray, flame spray, and the like. In some cases, the inter-connection, oxygen electrode, and air electrode can be the same material differing only in density and application technique, with the interconnection being the high density component.

The dense electrolyte 14, preferably from 0.02 mm to 0.15 mm thick, is a zirconia material, preferably at least 99% dense and most preferably 100% dense. The zirconia can be stabilized, that is, doped with a number of elements. Rare earth element stabilized zirconia, specifically yttria-stabilized zirconia is preferred, as it allows excellent oxygen ion mobility. A most preferred composition is $(ZrO_2)_{0.92}(Y_2O_3)_{0.08}$. Other mixed oxides can be used. The material must be effective to transfer ionic oxygen. It can be applied by chemical vapor deposition, plasma spray, flame spray, or sintering techniques.

The porous air electrode, 16, preferably from 0.05 mm to 2 mm thick, is a 20% to 60% porous material selected from metal-ceramic materials selected from the group consisting of platinum-zirconia, palladium-zirconia, and silver-palladium-zirconia, or a porous, sintered oxide selected from the group consisting of doped lanthanum manganite and doped lanthanum chromite where the preferred dopants are calcium, strontium, and magnesium, with strontium dopant preferred. Palladium-zirconia is the most preferred air electrode material. The air electrode must be effective to allow reduction of $O_2$ in the air to oxygen ions.

The number of cells 12 needed to provide a required volume of $O_2$ gas from air can be calculated for a given gas temperature. For a unit delivering 3 liters/minute of oxygen, delivered at 25° C., having cells of 18 cm$^2$ area, for a driving current density of 1.5 A/cm$^2$ and a cell current of 27 A(1.5 A/cm$^2 \times$ 18 cm$^2$); oxygen production per cell would be approximately 27 A/cell $\times$ 3.80 ml/A-min = 102.6 ml/min-cell. If a 3 liter/minute of $O_2$ at 25° C. are required, the number of cells needed would be 3000 ml $O_2$/min $\div$ 102.6 ml $O_2$/min-cell = 29 cells/stack.

The device operates at 900° C. at a current density of 1.5 amperes/cm$^2$, with pressurized air delivery to the device. The preferred embodiment oxygen generator 10 was manufactured by Westinghouse Electric Corporation.

The power dissipated as heat in the oxygen concentration system maintains the operating temperature. For example, in a system designed to deliver 3 liters per minute at (2 amp/cm$^2$) at 25° C. and atmospheric pressure, the power required to maintain 900° C. is about 500 watts. An oxygen concentration system sufficient to deliver this flow rate at these conditions would have 22 cells operating at 631 millivolts and 36 amperes/cell. The heat generated by such a system is 500 watts and the operating temperature will be maintained by the electrochemical production of oxygen.

One advantage to this oxygen generation system is its ability to generate oxygen at flow rates which are proportional to the electrical current supplied to the generator 10. For example, if a flow rate of 1 liter/minute is desired, the oxygen generation system requires only 12 amperes be supplied to the generator 10. The cell voltage is calculated by Ohms Law and will be 210 millivolts. The power dissipated in this case is only 55 watts. This is not enough heat to maintain the operating temperature and the generator 10 cannot operate correctly.

The difference between the oxygen generation heat and the temperature maintenance heat must be made up by an additional heater. The preferred additional heater is axial rod 30 discussed above. One advantage of the use of the Inconel rod 30 as a heat source is that electric current can be imposed on the rod 30 such that the rod dissipates an amount of heat required to maintain the operating temperature of the system. In some applications where the oxygen flow rate is low, the generators 10 may not generate enough heat to maintain operation of the device. In these cases, the rod 30 can be used as a heat source.

Another advantage of using the rod 30 to generate heat is the uniformity of the heating. High heating rates can be obtained upon the initial start up with the rod 30 centered inside the generators 10. Because the generators 10 are symmetrical about the rods 30, and because the generators 10 themselves are enclosed within concentric enclosures 120, 150, 180, stresses developed due to uneven heating are minimized.

Another advantage of the rod 30 and the cylindrical layout of the oxygen concentration system is the efficient use of heat. For example, if the heat source was to be located outside of the generators 10, then a portion of the heat would be directed toward the generators 10 and the remainder portion would be dissipated away from the generators 10. Because the rod 30 passes through the center of the generators, substantially all of the heat generated by the rods 30 heat the generators 10.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed:

1. An oxygen concentration system for producing oxygen from pressurized air, said system comprising:
   an electrochemical oxygen generator having an outer surface and selectively extracting oxygen from air by an electrochemical reaction;
   inner and outer enclosures, said generator being concentrically received within said inner enclosure said inner enclosure being concentrically received within said outer enclosure; and,
   inner and outer annuli, said inner annulus formed between said generator and said inner enclosure and said outer annulus formed between said inner enclosure and said outer enclosure, air being heated in said generator and being directed to said inner annulus, air in said outer annulus being cooler than air in said inner annulus.

2. The oxygen generation system of claim 1 further comprising:
   an annular housing interposed between said inner annulus and said generator, said housing comprising insulation to retain heat generated by said generator within said housing.

3. The oxygen generation system of claim 1 wherein air in said outer annulus flows in the same direction as air in said inner annulus.

4. The oxygen generation system of claim 1 wherein air in said outer annulus flows in the opposite direction as air in said inner annulus.

5. The oxygen generation system of claim 1 wherein said system operates independent of orientation.

6. The oxygen generation system of claim 1 further comprising:
heating means for heating said generator.

7. The oxygen generation system of claim 6 wherein said heating means is a rod extending co-axially within said generator, said rod being heated by means of an electric current.

8. An oxygen concentration system for producing oxygen from pressurized air, said system comprising:
an electrochemical oxygen generator, said generator having an outer surface and selectively extracting oxygen from air by an electrochemical reaction;
a first enclosure having a top end and a bottom end and an inward surface and an outward surface, said generator contained within said first enclosure;
a second enclosure having a top end and a bottom end and an inward surface and an outward surface, said first enclosure contained within said second enclosure;
a third enclosure having a top end and a bottom end and an inward surface and an outward surface, said second enclosure contained within said third enclosure;
a first annulus formed between said outer surface of said generator and said inner surface of said first enclosure;
a second annulus formed between said outward surface of said first enclosure and said inward surface of said second enclosure;
a third annulus formed between said outward surface of said second enclosure and said inward surface of said third enclosure; and,
an orifice in said third enclosure near said top end of said third enclosure, pressurized air entering orifice said and travelling downwardly in said third annulus, upward in said first annulus, and downward in said second annulus, and exiting said oxygen concentration system through said second annulus.

9. The oxygen concentration system of claim 8 wherein said second enclosure is made of a thermally non-insulating material.

10. The oxygen concentration system of claim 9 wherein the air entering said third annulus is cooler than the air in said second annulus,
said second enclosure transferring heat from air in said second annulus to air in said third annulus.

11. The oxygen concentration system of claim 8 wherein said third annulus contains the coolest air of air within said oxygen generation system.

12. The oxygen concentration system of claim 8 further comprising:
ports extending between said third annulus to said first annulus, said ports isolating air in said ports from air within said second annulus.

13. The oxygen concentration system of claim 8 wherein said ports extend through said first and second enclosures at a point adjacent said bottom end of said third enclosure.

14. The oxygen concentration system of claim 8 further comprising:
an inner upper dome covering said top end of said second enclosure, said inner upper dome having inward and outward surfaces, said inward surface being reflective.

15. The oxygen concentration system of claim 8 further comprising:
an outer upper dome comprising said top end of said third enclosure, an apex of said outer upper dome comprising an orifice.

16. The oxygen concentration system of claim 8 further comprising:
an inner bottom dome covering said bottom end of said second enclosure, said inner bottom dome having inward and outward surfaces, said inward surface being reflective.

17. The oxygen concentration system of claim 8 further comprising:
an outer bottom dome comprising said bottom end of said third enclosure, an apex of said outer upper dome comprising an orifice.

18. The oxygen concentration system of claim 15 further comprising:
a source of pressurized air connected to said orifice so that pressurized air enters said orifice and travels through said third annulus to said ports.

19. An oxygen generation system suitable for replenishing oxygen storage cylinders on aircraft, said system comprising:
a plurality of electrochemical oxygen generators, said generators being arranged in a hexagonal array and selectively producing oxygen from air by an electrochemical reaction, said generators having an outer surface;
a first enclosure, said first enclosure having top and bottom ends and inward and outward surfaces, said plurality of generators received within said first enclosure, said first enclosure being thermally insulated to keep heat generated by said generators within said first enclosure, said top end of said first enclosure being open, said bottom end comprising an outer bottom dome, an apex of said outer bottom dome comprising an orifice,
a second enclosure having top and bottom ends and inward and outward surfaces, said first enclosure being concentrically received within said second enclosure, said top end comprising an inner upper dome, said inner upper dome being non-insulating and having a reflective surface;
a third enclosure having top and bottom ends and inward and outward surfaces, said second enclosure being concentrically received within said third enclosure, said top end of said third enclosure comprising an outer upper dome, an apex of said outer upper dome terminating in an orifice;
a first annulus formed by said outer surface of said plurality of generators and said inward surface of said first enclosure;
a second annulus formed by said outward surface of said first enclosure and said inward surface of said second enclosure;
a third annulus formed by said outward surface of said second enclosure and said inward surface of said third enclosure; and,
ports connecting said third annulus to said first annulus, said ports extending through holes in said first and second enclosures, said ports being aerodynamically shaped so as to reduce losses within said second annulus, said ports having fins extending into said second annulus to transfer heat from air in said second annulus to said port, said port having fins extending inwardly into said port to transfer heat from said port to air in said port.

20. The oxygen concentration system of claim 12 wherein the ports are angled to tangentially introduce air into said first enclosure.

* * * * *